(12) United States Patent
Tanis (10) Patent No.: US 7,585,212 B2
(45) Date of Patent: Sep. 8, 2009

(54) COMBINE THRESHING ROTOR FRONT BEARING AND INLET SECTION WITH IMPROVED ANTI-WIND FEATURES INCLUDING A STRAW EJECTING CAPABILITY

(75) Inventor: Dale R. Tanis, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/821,295

(22) Filed: Jun. 22, 2007

(65) Prior Publication Data

US 2008/0318649 A1    Dec. 25, 2008

(51) Int. Cl.
*A01F 12/00*    (2006.01)
(52) U.S. Cl. .......................................... 460/68; 460/67
(58) Field of Classification Search .................. 460/59, 460/66, 67, 68, 69, 71, 72, 58
See application file for complete search history.

(56) References Cited

U.S. PATENT DOCUMENTS

| | | | |
|---|---|---|---|
| 3,537,460 A | 11/1970 | Van Buskirk | 130/27 |
| 4,248,248 A | 2/1981 | De Busscher et al. | 130/27 HA |
| 4,250,896 A | 2/1981 | Wagstaff et al. | 130/27 T |
| 5,145,462 A | 9/1992 | Tanis et al. | 460/68 |
| 5,387,153 A | 2/1995 | Tanis | 460/68 |
| 6,083,102 A | 7/2000 | Pfeiffer et al. | 460/68 |
| 6,296,566 B1 | 10/2001 | Tanis et al. | 460/70 |
| 6,719,626 B2 | 4/2004 | Federowich | 460/70 |
| 6,908,378 B2 | 6/2005 | Ricketts et al. | 460/70 |
| 7,166,025 B2 | 1/2007 | Tanis et al. | 460/68 |

*Primary Examiner*—Alicia M Torres
(74) *Attorney, Agent, or Firm*—Michael G. Harms; John William Stader; Patrick M. Sheldrake (57) ABSTRACT

A front rotor inlet section for a rotor of an agricultural combine, including anti-wind features for preventing winding or wrapping of plant materials about a front bearing therearound, and features for providing a straw ejecting capability, including at least one radially outwardly extending slot in a protuberance located adjacent to the front bearing and operable for conveying plant material to a radial outer region of the inlet section, and at least one shoulder or lip on the radial outer region extending at least partially circumferentially therearound and rearwardly, for conveying the crop material rearwardly away from the bearing.

14 Claims, 9 Drawing Sheets

COMBINE THRESHING ROTOR FRONT BEARING AND INLET SECTION WITH IMPROVED ANTI-WIND FEATURES INCLUDING A STRAW EJECTING CAPABILITY

TECHNICAL FIELD

The present invention relates generally to agricultural combine rotors, and more particularly, to a front bearing housing and front rotor inlet section combination having anti-wind features for preventing winding or wrapping of plant materials therearound, which features are improved and supplemented for providing a capability for pushing or conveying straw radially outwardly from adjacent to the front bearing, and also rearwardly therefrom.

BACKGROUND ART

A well-known form of harvesting machine is a rotary combine. A typical combine includes a crop harvesting apparatus which reaps grain stalks and other plant materials and feeds them to a separating or threshing apparatus. The grain stalks or other crop and plant materials harvested in the field are moved rearwardly from a crop harvesting header assembly and introduced for threshing to the rotor assembly by a crop feeder assembly.

In a rotary combine, the rotor assembly includes a generally tubular rotor housing mounted in the combine body. A driven rotor is coaxially mounted within the housing. The rotor comprises an infeed or inlet section and a cylindrical threshing section, and is supported at opposite ends by front and rear bearing assemblies.

The cylindrical threshing section of the rotor and the rotor housing mount cooperating threshing elements which separate grain from other material in a threshing zone. The crop material is threshed as it spirals around the rotor threshing section and passes through openings in the rotor housing.

As discussed in Tanis U.S. Pat. No. 5,387,153, which is assigned to the same assignee as the present invention, the ability to transfer crop materials from the feeder assembly to the threshing zone of the rotor assembly is a key to efficient combine operations. Most rotary combine rotors include an infeed or inlet section impeller comprised of a series of impeller blades or flights arranged at a forward end of the rotor. The impeller flights rotate within a housing which is a part of the rotor housing. During harvesting operations, the generally linear movement of the crop materials received from the feeder assembly is converted by the rotating impeller flights into a rotating, circulatory movement, in a rearward and outward direction.

When rotary combines are used on certain long-stemmed leguminous or grassy crops, such as windrowed perennial or annual rye grass, clover, and bent grass, and oats, there is a potential for portions of such grassy crops and other plant materials such as weeds to extend into the impeller flights while other portions remain partially engaged with the feeder assembly. The latter portions tend to move toward the axis of rotation of the rotor assembly, and may wrap about the front rotor bearing or shaft. This can rob power and cause damaging heat build up around the bearing, potentially causing premature failure thereof.

Long-stemmed leguminous or grassy crops also have a tendency to wrap around or "hairpin" about the leading edge of the impeller blades or flights. This hairpinning action can create a buildup of crop materials on the aforementioned leading edge, which reduces the effectiveness of the impeller and further reduces combine efficiency.

Numerous front rotor inlet and bearing housing designs, including that disclosed in the above referenced Tanis patent, have been proposed to prevent crop materials from becoming entangled with the front rotor bearing and prevent hairpinning about the impeller blades' leading edges. The design of the above referenced Tanis patent has provided a marked improvement in this regard. However, it requires a number of individual parts, and the higher costs associated therewith.

Tanis U.S. Pat. No. 6,296,566, and Tanis et al. U.S. Pat. No. 7,166,025 B2 also assigned to the same assignee as the present invention, disclose infeed impellers for a rotary combine which utilizes anti-winding vanes on the rotor which cooperate with vanes on the front bearing assembly to force debris radially outwardly away from the axis of the rotor. However, these combinations have been found to still suffer to some extent from some of the above-discussed shortcomings, more particularly, that long, particularly wet, crop material winds onto the rotor shaft which creates heat, consumes power, and causes early bearing failures.

Accordingly, what is sought is a front bearing housing anti-wind element and/or front rotor inlet section which provides improved anti-wind characteristics, particularly with regard to long, wet straw and other crop material, and more particularly, which is operable for conveying such crop material radially outwardly and rearwardly away from the associated bearing supporting the inlet section.

SUMMARY OF THE INVENTION

According to a preferred aspect of the invention, a front rotor inlet section for a threshing rotor of an agricultural combine, which provides one or more of the above sought characteristics, is disclosed.

According to a preferred aspect of the invention, the front rotor inlet section includes a body adapted to be mounted on a front end of a rotor around a frontwardly and rearwardly extending rotational axis therethrough for rotation with the rotor in a predetermined rotational direction about the rotational axis. The body has a radial outer circumferential periphery and at least one protuberance extending frontwardly therefrom and at least partially around the rotational axis. The outer circumferential periphery has a radially outwardly facing outer circumferential surface disposed radially outwardly and rearwardly of the protuberance, and the protuberance has a radially inwardly facing inner circumferential surface extending around and defining a front center space. At least one frontwardly facing slot extends radially through the protuberance from the front space to the outer circumferential surface, the slot being raked back in the radial outward direction relative to the rotational direction, and the slot being defined in part by an edge surface which faces the rotational direction and which is also raked back in the radial outward direction relative to the rotational direction. As a result, when the body is rotated about the rotational axis, the edge surface will be operable for pushing or conveying crop material, particularly long elements of straw and the like, through the slot from the front center space, radially outwardly to the outer circumferential surface. The outer circumferential surface includes a radially outwardly projecting lip or rearwardly facing shoulder extending circumferentially in a direction opposite the rotational direction and rearwardly from a radial outer end portion of the slot, so as to be operable for positively pushing or conveying the crop material rearwardly and away from the radial outer end portion of the slot during the rotation of the body, for conveyance rearwardly by impeller augers or flights of the rotor.

The protuberance is configured and adapted to be positioned in an annular or circular space between a bearing housing and a shroud extending therearound radially outwardly thereof, with the bearing housing extending into the front center space. As a result, during the rotation of the inlet section, the protuberance will rotate through the space around the bearing housing, and any long elements of plant material, such as long wet straw in that space will be engaged by the edges and/or surfaces of the at least one slot, so as to be pushed or conveyed through the slot radially outwardly thereby, away from the bearing housing. The plant material can also be cut or ground up by repeated contact with one or more of the edges of the slot. At the radial outer periphery, the plant material will be engaged and pushed or conveyed rearwardly by the lip or shoulder along the outer circumferential surface of the body through a space between that surface and the shroud, to the impeller augers or flights of the rotor, for processing by the threshing system.

Additionally, plant material, particularly the longer elements of plant material, such as straw and the like, which begins to wrap around the body of the inlet section so as to work into the enter the space between the body of the inlet section and the shroud, will be forced rearwardly by the lip or shoulder. No straight line radial inward path exists for passage of plant material past the body and so as to wrap around the bearing housing or shaft.

Thus, according to a preferred aspect of the invention, the positioning and rotation of the protuberance radially outwardly of the bearing housing in axial overlapping relation thereto, and the pushing or conveying of crop material radially outwardly away from the bearing housing by the one or more edges and/or surfaces of the at least one slot through the protuberance, in combination with the rearward pushing or conveying of the crop material around the radial outer periphery of the body through the space formed thereby with the inner periphery of the shroud, provides an improved capability for keeping long crop material from wrapping around the bearing housing and the shaft or other element supporting the rotor for rotation relative thereto.

As another preferred aspect of the invention, the body further includes a pair of diametrically opposed inlet flight extensions extending radially outwardly therefrom, each of the extensions being swept back relative to the rotational direction and having a leading edge facing in the rotational direction, and an opposite trailing edge. The lip or shoulder extends circumferentially partially around the radial outer periphery of the body from adjacent to the associated slot, to adjacent to the leading edge of one of the extensions, so as to push or convey the crop material into the path of rotation of the inlet flight extensions, so as to be carried or propelled radially outwardly away from the central region of the inlet section and the bearing housing.

BRIEF DESCRIPTION OF THE DRAWINGS

Preferred aspects of the invention, including of its construction and method of operation, are illustrated more or less diagrammatically in the drawings, in which.

DETAILED DESCRIPTION OF THE INVENTION

Figure 1:
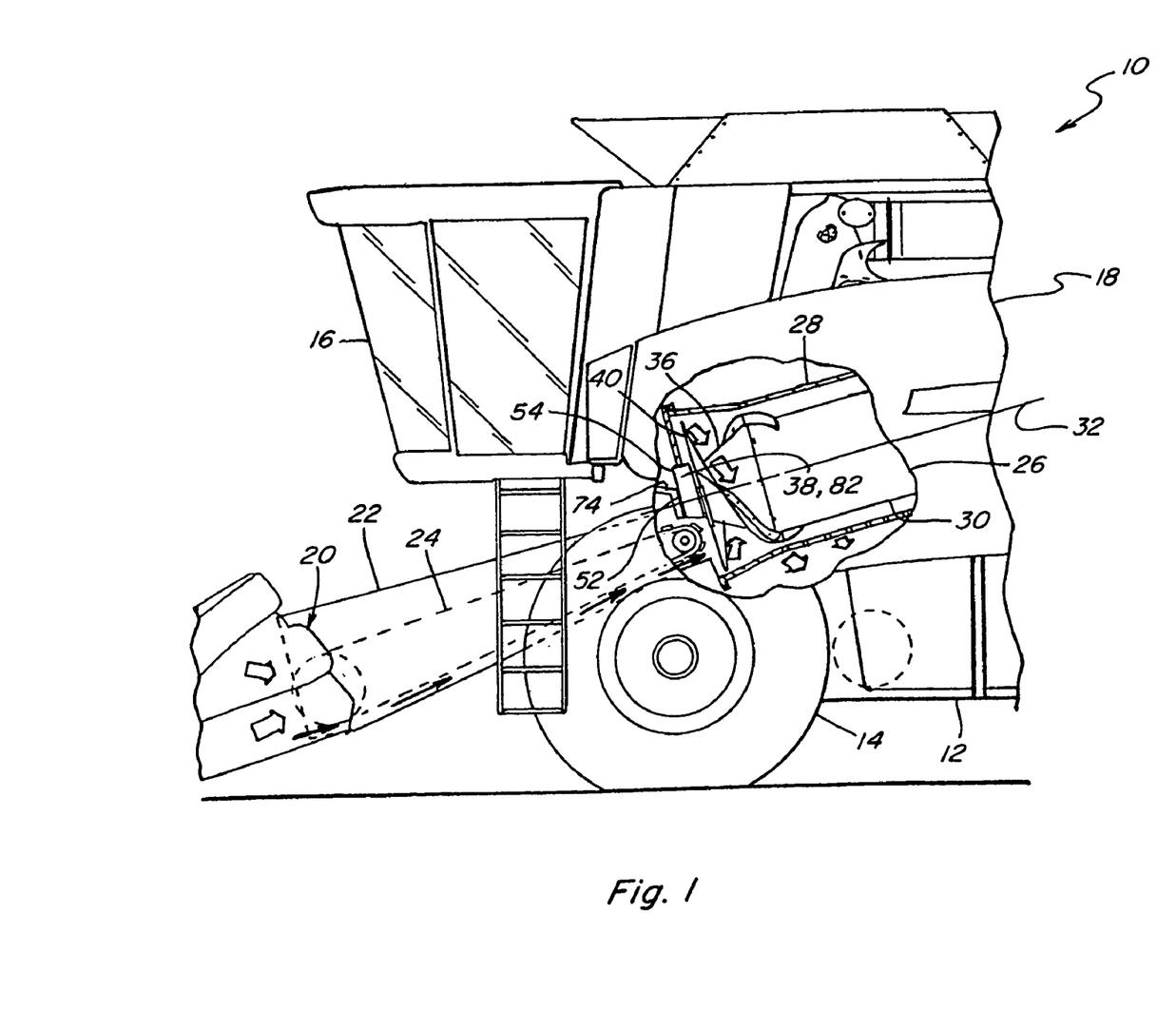
FIG. 1 is a side elevational view of a portion of a rotary combine, showing in partial section a crop feeder assembly, and a threshing rotor including a front inlet section thereof and an anti-wind shroud assembly, the front rotor inlet section and shroud cooperating to provide improved anti-wind characteristics according to preferred aspects of the invention.

Referring now to the drawings, in FIG. 1 a self-propelled rotary combine is seen generally at 10. Combine 10 includes a front portion 12 including front wheels 14, an operator cab 16, and an engine (not shown) suitably supported within a body 18. The transfer of power from the engine to various driven components of combine 10 is effected conventionally.

Combine 10 is provided with a crop harvesting header assembly 20 for cutting and gathering crop materials. Header assembly 20 cuts and directs the crop material into a crop feeder assembly 22 including a conveyor 24. Conveyor 24 carries the crop material upwardly toward a rotor assembly 26, which threshes grain from material other than the grain. Rotor assembly 26 is supported in a conventional manner inside body 18. Rotor assembly 26 includes a tubular rotor housing 28 mounted in a front to rear orientation in body 18. Rotor assembly 26 also includes a rotor 30 is mounted in housing 28 for rotation therein in a predetermined rotational direction about a rotational axis 32 through rotor 30 oriented at an acute angle to horizontal as shown.

Figure 2:
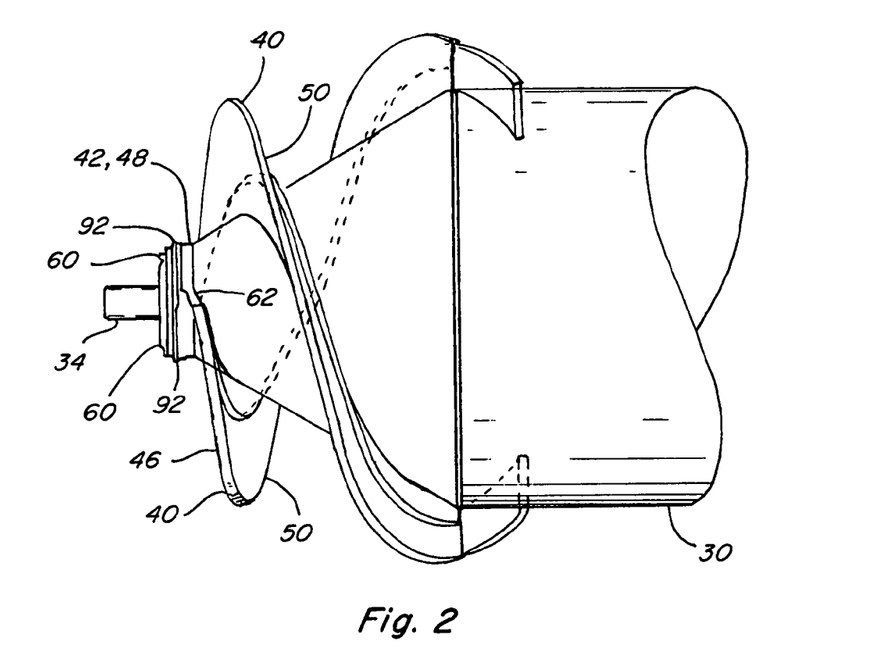
FIG. 2 is an enlarged fragmentary side view of the rotor and front inlet section of FIG. 1.
Figure 3:
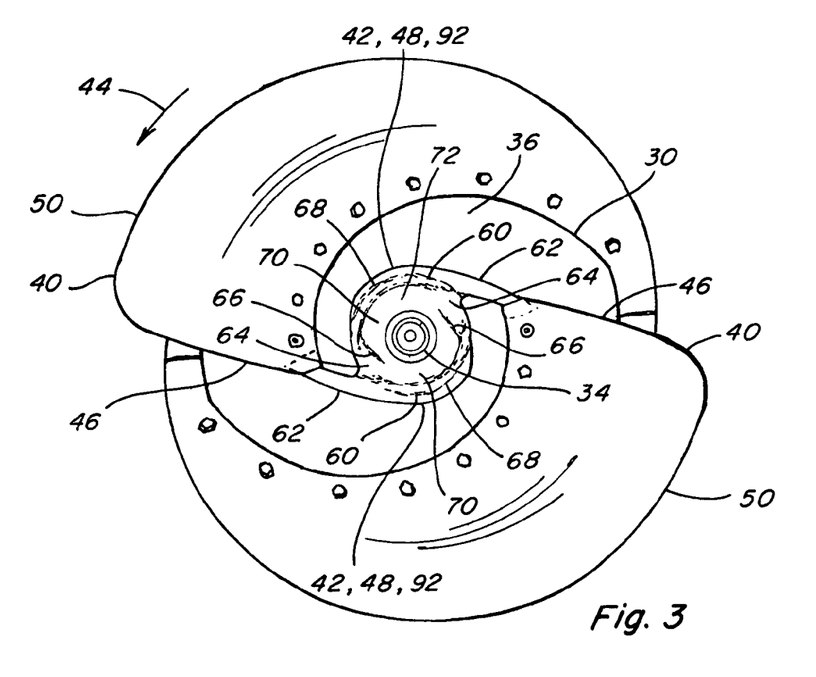
FIG. 3 is a front view of the rotor of FIG. 1.
Figure 4:
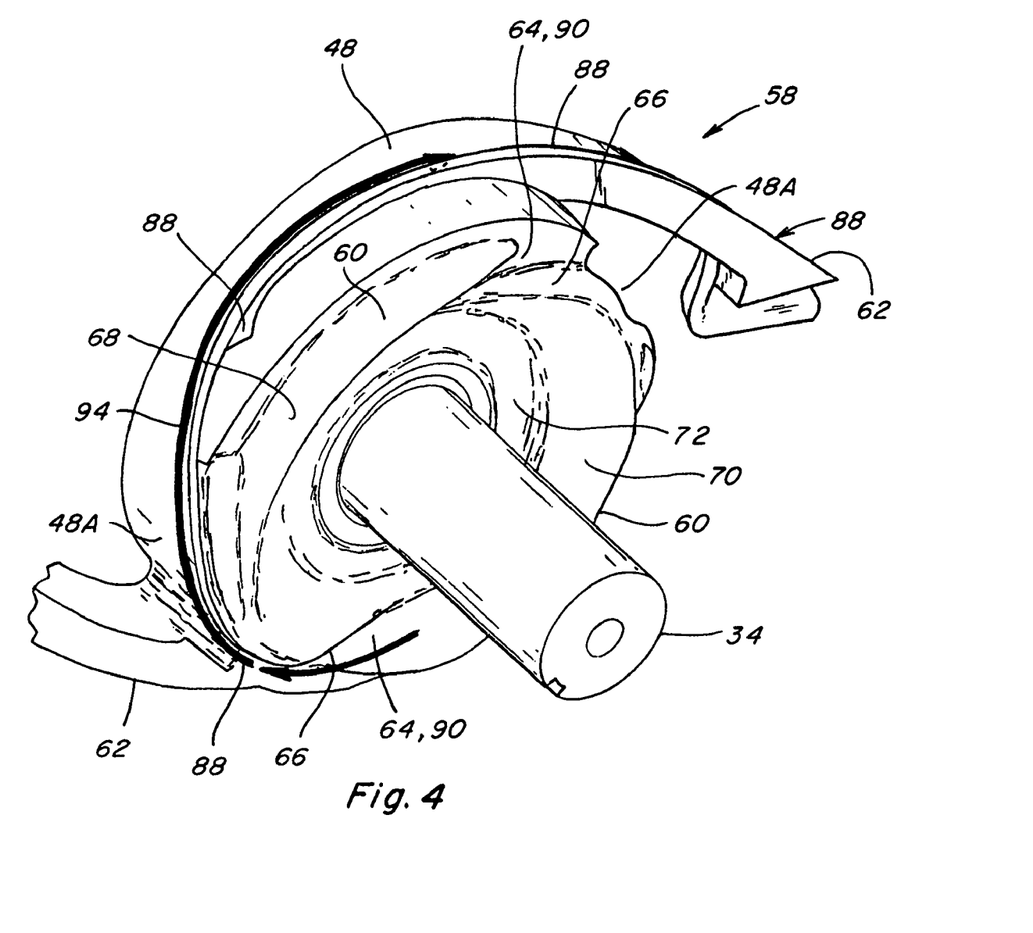
FIG. 4 is a perspective view of a body of the front rotor inlet section of FIG. 1.
Figure 5:
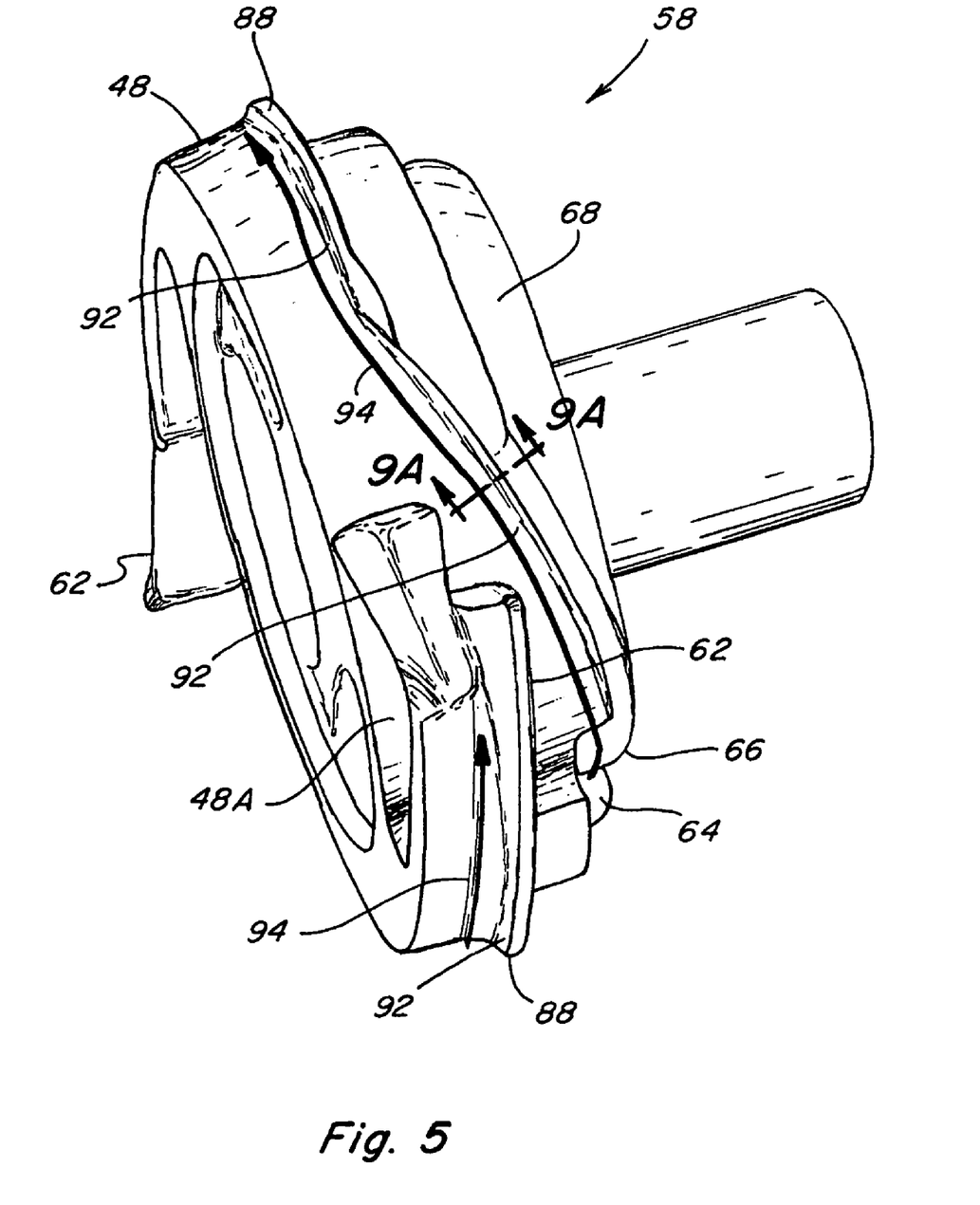
FIG. 5 is another perspective view of the body of the front rotor of FIG. 1.
Figure 6:
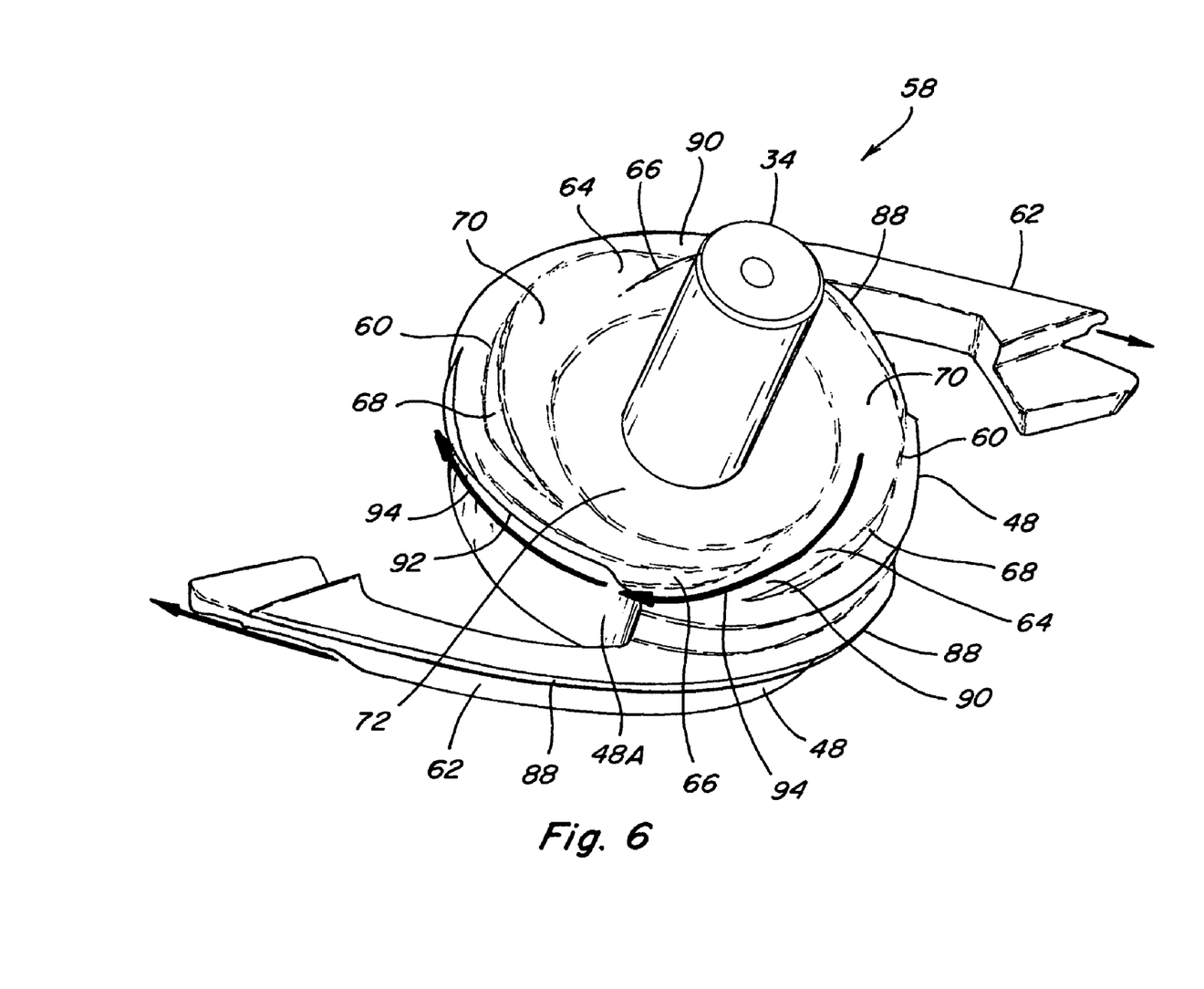
FIG. 6 is another perspective view of the body of the front rotor of FIG. 1.
Figure 7:
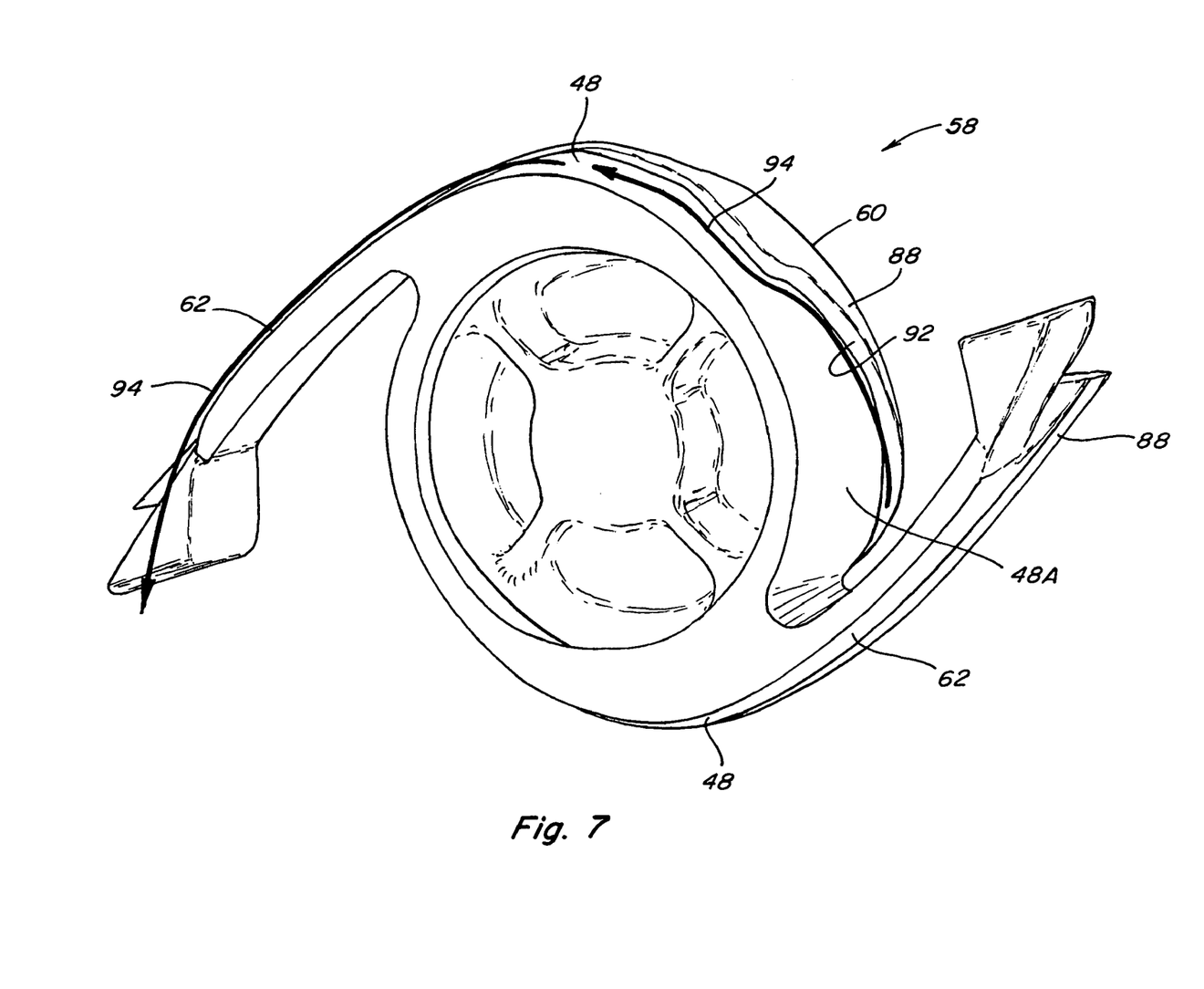
FIG. 7 is still another perspective view of the body of the front rotor of FIG. 1.
Figure 8:
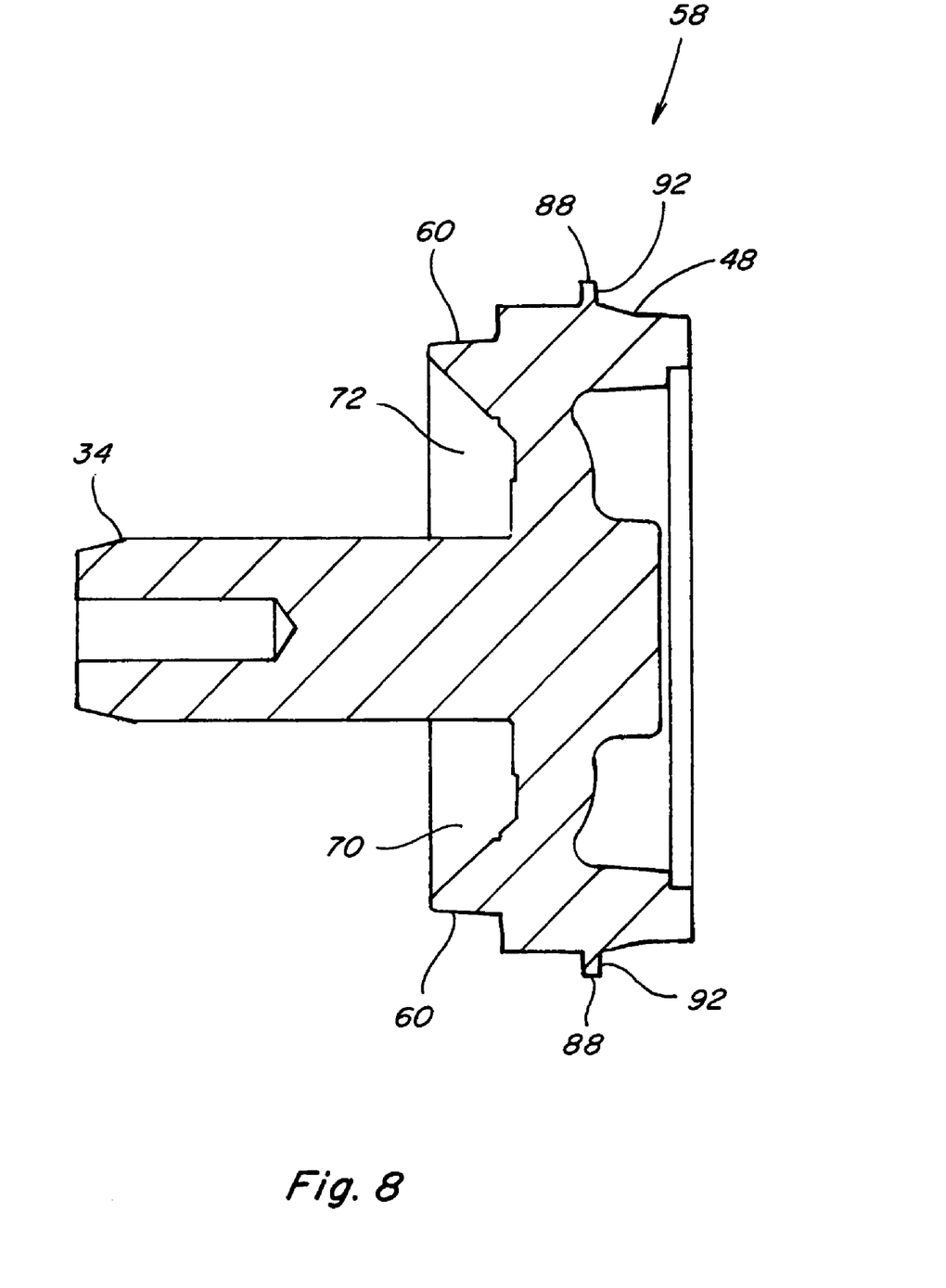
FIG. 8 is a sectional view of the body.

Referring also to FIGS. 2 and 3, rotor 30 is a hollow tube. Rotor 30 of rotor assembly 26 includes a front shaft 34 projecting concentrically about rotational axis 32 from a front infeed or inlet section 36, and a rear threshing section. Front inlet section 36 includes two helical impeller augers 40 extending therearound in a rearward direction from a front center portion 42 to the threshing section. Front inlet section 36 has a conical shape, extending radially outwardly relative to axis 32 rearwardly from adjacent to front center portion 42 to the threshing section Rotor 30 is rotatable in rotor housing 28 in the rotational direction denoted by arrow 44 in FIG. 3. Each impeller auger 40 includes a flight having a leading edge 46 which extends radially outwardly with respect to axis 32 from a radial outer circumferential edge or periphery 48 of front center portion 42, and terminating at a radial outer edge 50. Edges 46 are raked or swept back in relation to rotational direction 44. Each impeller auger preferably has a helical pitch that increases in the rearward direction along the length thereof, which enables augers 40 to aggressively move plant material rearwardly from feeder assembly 22 during rotation of rotor 30, while leading edges 46 are disposed and rotate in closely spaced relation to an anti-wind shroud assembly 52 which supports and extends around and protects a front bearing housing 54 (FIGS. 1, 9 and 9B) carrying a front bearing 56 (FIGS. 9 and 9B) for supporting shaft 34 and thus inlet section 36 of rotor 30 for rotation, as will be explained. Front center portion 42 of inlet section 36 preferably includes a front plate or a body 58 which is also part of rotor assembly 26, and is preferably welded or otherwise fixedly mounted onto inlet section 36. Body 58 is preferably of cast or forged construction, and shaft 34 is preferably integrally formed therewith.

Referring also to FIGS. 4, 5, 6, 7 and 8, body 58 includes radial outer periphery 48, and at least one and preferably two frontwardly extending protuberances 60, that, together, extend at least substantially completely around or envelope axis 32. Body 58 includes several anti-wind elements, including diametrically opposed extensions 62 of leading edges 46 of impeller augers 40 (FIGS. 2 and 3) which extend radially outwardly and at least generally tangentially from radial outer periphery 48 of body 58 to connect to edges 46, respectively, and which are also raked or swept back with respect to the rotational direction, to provide a smooth transition of flow of crop material from the extensions to the augers. As shown in FIGS. 1 and 9B, anti-wind shroud assembly 52 includes an anti-wind wiper 38 having a radial outer surface 82 that extends progressively more radially outwardly in the rotational direction denoted by arrow 44, so as to cooperate with extensions 62 for transitioning the flow of the crop material to the augers. Protuberances 60 preferably form or include a pair of slots 64 facing frontwardly and extending radially therethrough, each slot 64 preferably being raked or swept back relative to the rotational direction and being defined in part or bounded by an edge surface 66 of a protuberance 60 oriented to face in the rotational direction, and which surface 66 is also preferably swept or raked back in the radial outward direction. Protuberances 60 additionally each have a radially outwardly facing outer periphery including an outer circumferential surface 68, and a radially inwardly facing inner periphery including an inner circumferential surface 70 therearound. Preferably, inner circumferential surface 70 has a tapered or frusto-conical shape, which extends convergingly rearwardly toward axis 32, defining a front center space 72.

Figure 9:
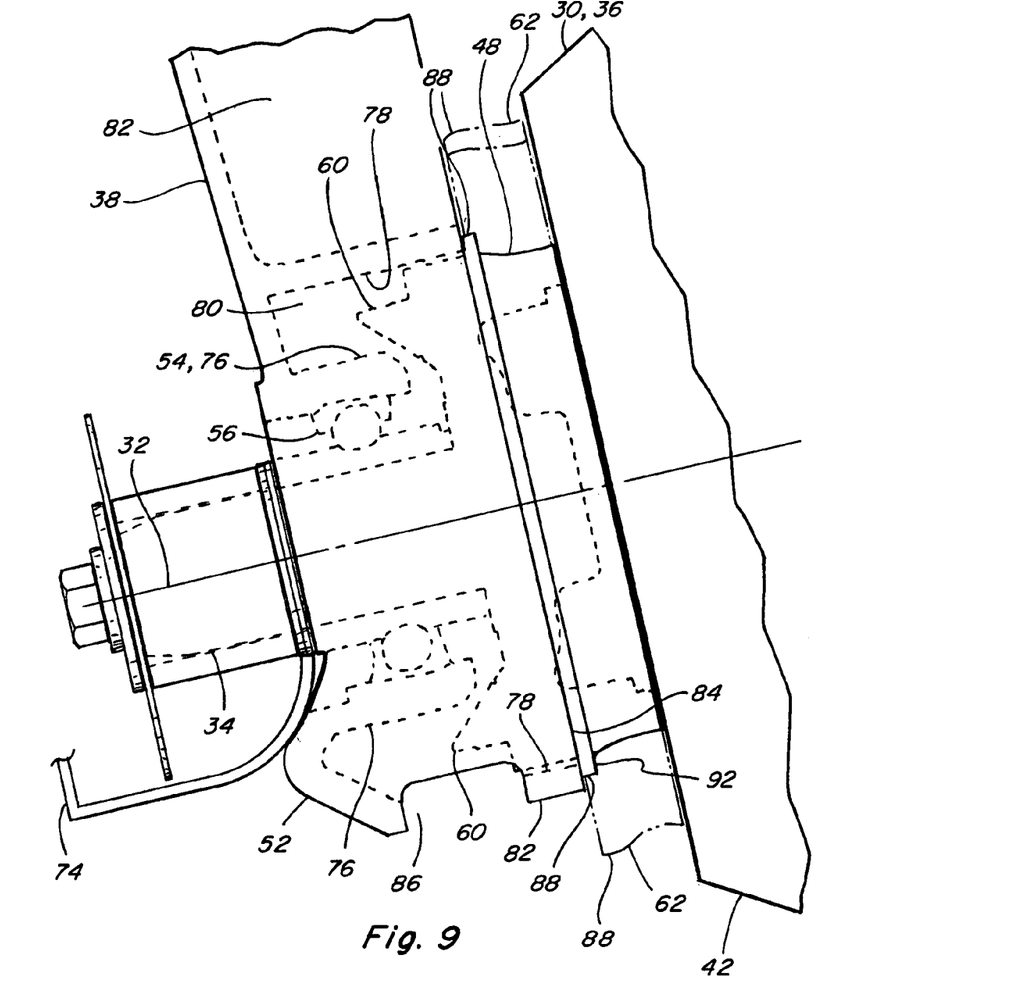
FIG. 9 is a fragmentary side view of the front rotor inlet section and the front bearing housing and shroud of FIG. 1, illustrating the cooperative relationship therebetween.

Referring more particularly to FIGS. 1 and 9, anti-wind shroud assembly 52 is mounted on a bearing support 74 frontwardly of inlet section 36 of rotor 30, such that outer peripheral anti-wind wiper 38 and outer surface 82 thereof extend progressively radially outwardly in the rotational direction 44 in front of extensions 62 (FIG. 1), wiper 38 preferably being integrally formed or cast with front bearing housing 54 (FIG. 9). Front bearing housing 54 contains and carries conventional bearing 56 for rotatably supporting shaft 34 and thus inlet section 36 and the front end of rotor 30 for rotation about axis 32. Bearing housing 54 has a circumferential radial outer surface 76 therearound having a predetermined radial or diametrical extent. Anti-wind shroud assembly 52 has a radial inner surface 78 having a predetermined radial extent which is greater than that of outer surface 76 of bearing housing 54, and which is located radially outwardly thereof and extends at least partially therearound, such that at least a partial or generally circular or annular space 80 or path extends around bearing housing 54 as defined by surfaces 76 and 78. Inner surface 78 is also of at least slightly or marginally greater radial extent than the radial outer periphery of protuberances 60, such that protuberances 60 are cooperatively receivable in space 80 for rotation therein. Radial outer surface 82 of shroud assembly 52 extends partially around bearing housing 54 and transitions in the direction of rotation onto anti-wind wiper 38, and a rearwardmost anti-wind wiper edge 84 disposed between surfaces 78 and 82, extends along anti-wind wiper 38 also, so as to be spaced just marginally frontwardly of radial outer periphery 48 of front center portion 42, and closely in front of extensions 62, for forcing crop material away from the gap between the anti-wind shroud and the inlet section, to limit infiltration of crop material into space 80. Anti-wind shroud assembly 52 preferably also include an opening such as opening 86 through the lowest or bottommost portion thereof and communicating or connecting with space 80, through which crop material can be ejected from space 80 by the rotary movement of protuberances 60 therein.

As shown variously in FIGS. 2, 3, 4, 5, 6, 7, 8, 9 and also 9A and 9B, outer periphery 48 of body 58 includes a radially recessed portion 48A adjacent to the radial outer end of each slot 64, and a radially outwardly projecting lip or shoulder 88 extending circumferentially in the direction opposite the rotational direction and rearwardly, generally from adjacent to portion 48A and a radial outer end portion 90 of each of slots 64, along and adjacent to a leading portion of each extension 62, to about the radial outer end thereof. Each shoulder 88 has a circumferentially extending rearwardly oriented or facing surface portion 92, which is configured so as to be operable for pushing or conveying the crop material rearwardly away from the radial outer end portion of the slot during the rotation of the body, as generally denoted by arrows 94. This will bring at least some of the crop material into the path of extensions 62, so as to then be carried or guided thereby rearwardly to impeller augers 40.

Figure 9A:
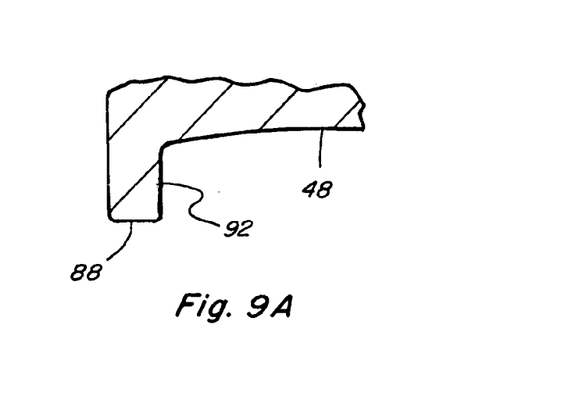
FIG. 9A is an enlarged fragmentary sectional view of the body taken along line 9A-9A of FIG. 5, illustrating a shoulder thereof.
Figure 9B:
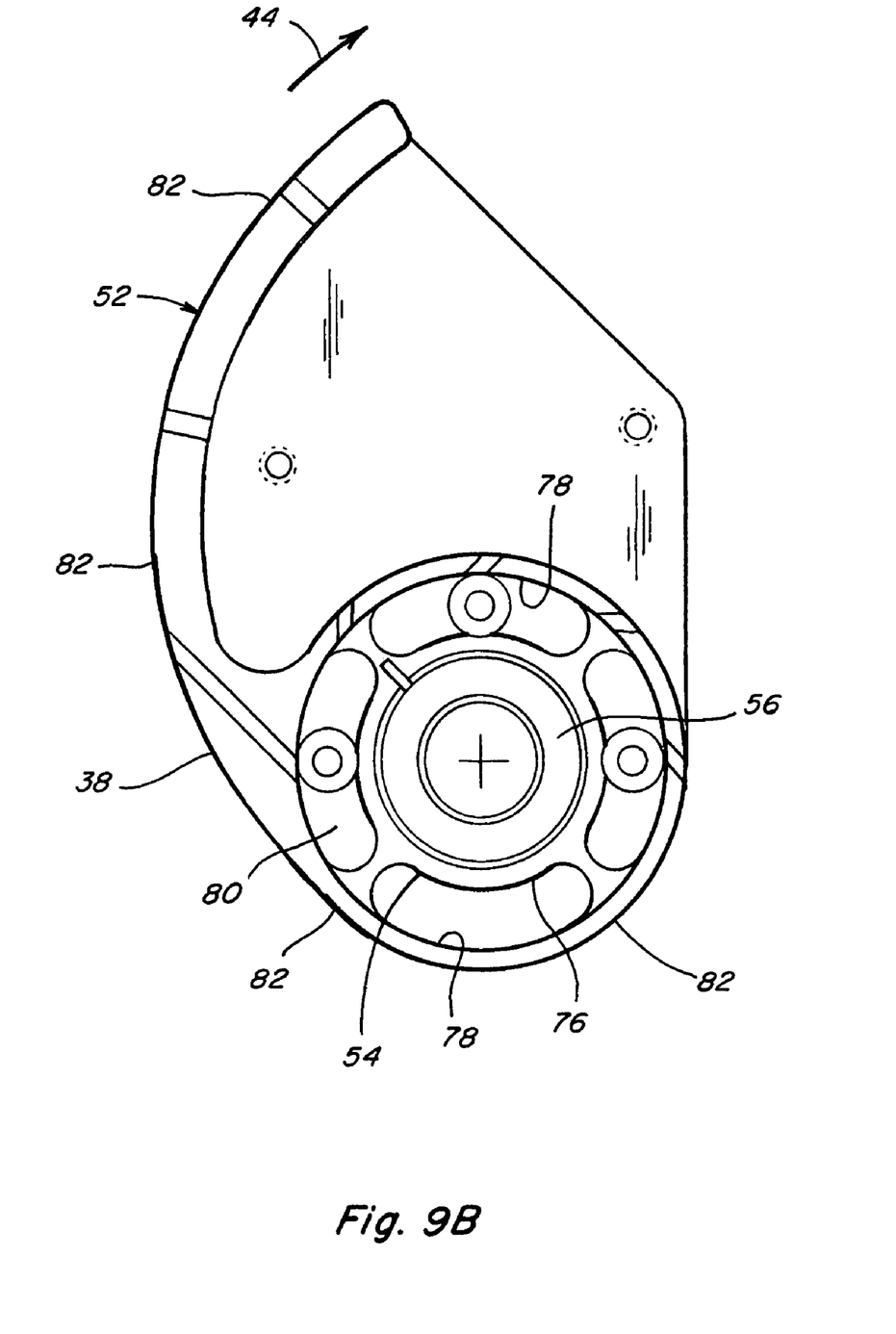
FIG. 9B is a rear view of the anti-wind shroud assembly of FIG. 1.

Referring more particularly to FIGS. 9 and 9A, it can be observed that shoulder 88 will rotate in close proximity to anti-wind wiper edge 84 of shroud assembly 52, so as to cooperate therewith in the rearward pushing of the crop material. The positioning and rotation of shoulder 88 in close proximity to edge 84 will also serve as an active barrier to passage of crop material frontwardly into space 80 through the gap or space between shoulder 88 and edge 84. At the same time, the lesser radial extent of recessed portions 48A of periphery 48 compared to other portions thereof, provides a gap radially inwardly of extensions 62, for the passage of crop material propelled radially outwardly through slots 64, to pass radially outwardly and rearwardly from space 80. As a result, crop material has essentially no straight-line path to enter space 80, but a path is provided for the exit or expulsion of crop material therefrom.

Here, it should be noted in reference to inner circumferential surface 70, that that surface is configured so as to effect the radial outward slinging of crop material thereover by the rotation of body 58, and is depicted as having a generally frusto-conical shape although it is contemplated that this surface can have other similar shapes, such as, but not limited to, near frusto-conical, and slightly concave, curved shapes.

It should also be noted that shoulders 88 follow a generally helical path partially around outer periphery 48 and radially outwardly along the respective extensions 62, and can vary in slope or steepness in the axial direction. Shoulders 88 can also vary in radial extent. Thus, as an advantage of the present invention a continuous anti-wind action from the center region of body 58, to the augers 40, is provided. During rotation, crop material within front center space 72 will be subjected to a radial outward slinging action by surface 70. Crop material will also be subject to being forced radially outwardly by contact with edge surface or surfaces 66 of protuberance or protuberances 60, to a portion or portions 48A of periphery 48 so as to be capable of being augered or moved radial outwardly and rearwardly by contact with surface 92 of shoulder 88, along periphery 48 and an extension 62, to an auger 40. At the same time the rotation of extensions 62, and shoulders 88, will perform the anti-wind function to keep crop material from winding into the gap between body 58 and anti-wind shroud assembly 52.

It should be noted that protuberances 60 are shown and discussed herein including two of the slots 64, located at diametrically opposed positions therethrough. It should be recognized and appreciated, however, that just one slot, or more than two slots, located at various positions through the protuberance could be used, depending on factors such as, but not limited to, characteristics of crop material with which the combine is to be used. Also, dimensions of protuberance 60, and the sectional shape thereof, can be varied as required or desired for a particular application.

Here, it should also be noted that the terms "rearward" and "rearwardly" are used in respect to rotor 30, as denoting toward the threshing end thereof, and not with respect to the rearward end of combine 10, as it is recognized that rotor 30 could be oriented otherwise than front to rearwardly with respect to combine 10, such as in a side to side orientation therein. Additionally, it should be noted that the terms "radial" and "radially" are used with respect to axis 32.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A front rotor inlet section for a threshing rotor of an agricultural combine, comprising:
a body adapted to be mounted on a front end of a rotor around a frontwardly and rearwardly extending rotational axis therethrough for rotation with the rotor in a predetermined rotational direction about the rotational axis, the body having a radial outer circumferential periphery and at least one protuberance extending frontwardly therefrom and at least partially around the rotational axis, the outer circumferential periphery having a radially outwardly facing outer circumferential surface disposed radially outwardly and rearwardly of the protuberance, the protuberance having a radially inwardly facing inner circumferential surface extending around and defining a front center space, and the at least one protuberance forming at least one frontwardly facing slot extending radially from the front space to the outer circumferential surface, the slot being raked back in the radial outward direction relative to the rotational direction and defined in part by an edge surface which faces the rotational direction and which is also raked back in the radial outward direction relative to the rotational direction such that when the body is rotated about the rotational axis the edge surface will be operable for pushing crop material from the front center space radially outwardly to the outer circumferential surface, and the outer circumferential surface including a radially outwardly projecting shoulder extending circumferentially in a direction opposite the rotational direction and rearwardly from a radial outer end portion of the slot, so as to be operable for pushing crop material rearwardly and away from the radial outer end portion of the slot during the rotation of the body, wherein the radial outer periphery of the body further comprises a pair of diametrically opposed inlet flight extensions extending radially outwardly therefrom, each of the extensions being swept back relative to the rotational direction and having a leading edge facing the rotational direction and configured for carrying crop material that comes in contact therewith during the rotation of the body, radish outwardly away from the body.

2. The front rotor inlet section of claim 1, comprising two of the slots at diametrically opposed locations around the rotational axis, and two of the radially outwardly projecting shoulders extending circumferentially in the direction opposite the rotational direction and rearwardly from the radial outer end portions of the slots, respectively.

3. The front rotor inlet section of claim 1, wherein the body comprises an axial center portion having an integral axially centered shaft extending axially therefrom.

4. The front rotor inlet section of claim 1, comprising two of the slots disposed in diametrically opposed relation one to the other, and two of the shoulders extending rearwardly from the radial outer end portions of the slots, respectively, the shoulders being further configured so as to be operable during the rotation of the body for pushing crop material to the inlet flight extensions, respectively.

5. The front rotor inlet section of claim 1, wherein the radially inwardly facing inner circumferential surface is generally frusto-conical shaped.

6. A front rotor inlet section for a threshing rotor of an agricultural combine, comprising:
a body adapted to be mounted on a front end of a rotor around a frontwardly and rearwardly extending rotational axis therethrough for rotation with the rotor in a predetermined rotational direction about the rotational axis, the body having a radial outer circumferential periphery and at least one protuberance extending frontwardly therefrom and extending at least partially around the rotational axis so as to bound and define a front center space through which the rotational axis extends, the at least one protuberance defining at least one frontwardly facing slot extending radially outwardly from the front center space to the radial outer circumferential periphery, and the radial outer circumferential periphery including a rearwardly facing shoulder extending from adjacent to a radial outer end portion of each of the slots, respectively, rearwardly and at least partially circumferentially around the body, wherein during rotation of the body in the rotational direction about the rotational axis, the slot will convey crop material present in the front center space radially outwardly to the shoulder, and the shoulder will convey the crop material rearwardly along the outer circumferential periphery of the body, wherein the radial outer periphery of the body further comprises a pair of diametrically opposed inlet flight extensions extending radially outwardly therefrom, each of the extensions being swept back relative to the rotational direction and having a leading edge facing in the rotational direction and configured for carrying crop material that comes in contact therewith during the rotation of the body, radially outwardly away from the body, and the shoulders extending circumferentially from adjacent to the radial outer end portions of the slots to the inlet flight extensions, respectively.

7. The front rotor inlet section of claim 6, comprising two of the slots at diametrically opposed locations around the rotational axis, and two of the shoulders.

8. The front rotor inlet section of claim 6, wherein the body comprises an axial center portion having an integral axially centered shaft extending axially therefrom.

9. The front rotor inlet section of claim 6, comprising two of the slots disposed in diametrically opposed relation one to the other, and two of the shoulders extending rearwardly from the radial outer end portions of the slots, respectively, the shoulders being further configured so as to be operable during the rotation of the body for pushing crop material to the inlet flight extensions, respectively.

10. Apparatus supporting a front end of an agricultural combine rotor for rotation in a predetermined rotational direction about an axis extending therethrough, comprising:

a rotor front inlet section having a radial outer circumferential surface extending therearound and at least one protuberance extending frontwardly therefrom about the axis, the at least one protuberance extending around and defining a front center space;

a bearing housing supported on the combine and holding a bearing rotatably supporting the rotor front inlet section, the bearing housing being located at least partially within the front center space, and an anti-wind shroud extending at least partially around the bearing housing and having a radial inner circumferential periphery spaced radially outwardly from a radial outer periphery of the bearing housing defining a circumferential space therearound, the protuberance extending frontwardly into the circumferential space in closely spaced relation to the radial outer periphery of the bearing housing, so as to serve as a barrier to entry of plant material therebetween; and the at least one protuberance defining at least one slot extending radially outwardly from the front center space to the radial outer circumferential surface, the slot being raked back in the rotational direction, and the radial outer circumferential surface including a rearwardly facing shoulder adjacent to the radial outer periphery of the bearing housing and extending from a radial outer end portion of each of the slots, respectively, rearwardly and at least partially circumferentially around the inlet section, wherein during rotation of the inlet section in the rotational direction about the rotational axis, crop material present in the front center space will be conveyed through the slot radially outwardly to the shoulder, and the shoulder will convey the crop material rearwardly through the space between the outer circumferential periphery of the inlet section and the radial outer periphery of the bearing housing.

11. The apparatus of claim 10, comprising two of the slots at diametrically opposed locations around the rotational axis, and two of the shoulders.

12. The apparatus of claim 10, wherein the inlet section comprises an axial center portion having an integral axially centered shaft extending axially therefrom.

13. The apparatus of claim 10, wherein the radial outer circumferential surface of the inlet section further comprises a pair of diametrically opposed inlet flight extensions extending radially outwardly therefrom, each of the extensions being swept back relative to the rotational direction and having a leading edge facing in the rotational direction and configured for carrying crop material that comes in contact therewith during the rotation of the inlet section about the rotational axis, radially outwardly.

14. The apparatus of claim 13, comprising two of the slots disposed in diametrically opposed relation one to the other, and two of the shoulders extending rearwardly from the radial outer end portions of the slots, respectively, the shoulders being further configured so as to be operable during the rotation of the inlet section for pushing crop material rearwardly to the inlet flight extensions, respectively.

\* \* \* \* \*